United States Patent [19]

McIntosh et al.

[11] 4,394,089
[45] Jul. 19, 1983

[54] COLOR PHOTOPRINTING WITH A SCANNING MEMORY MASK

[75] Inventors: Walter L. McIntosh, Woodbridge; John N. Street, Alexandria, both of Va.

[73] Assignee: LogEtronics, Inc., Springfield, Va.

[21] Appl. No.: 304,765

[22] Filed: Sep. 23, 1981

[51] Int. Cl.³ .............................................. G03B 27/04
[52] U.S. Cl. ........................................ 355/88; 355/20; 355/38; 355/132; 358/54; 358/60; 358/75; 358/214
[58] Field of Search .......................... 355/20, 38, 67, 80, 355/81, 83, 84, 132, 45, 68, 88; 358/80, 214, 256, 75, 60, 54, 83, 1; 340/347 AD; 354/23 D

[56] References Cited

U.S. PATENT DOCUMENTS

| | | | |
|---|---|---|---|
| 3,005,042 | 10/1961 | Horsley | 355/20 X |
| 3,519,347 | 7/1970 | Bowker et al. | 355/38 X |
| 3,571,493 | 3/1971 | Baker | 358/60 |
| 3,724,947 | 4/1973 | Paulus | 355/88 X |
| 3,770,882 | 11/1973 | Szymber | 358/1 |
| 3,851,094 | 11/1974 | Sasabe et al. | 358/83 |
| 3,926,520 | 12/1975 | Kaufman | 355/80 |
| 3,928,719 | 12/1975 | Sasabe et al. | 358/54 X |
| 3,934,081 | 1/1976 | Schumacher | 355/20 X |
| 3,961,366 | 6/1976 | Weishaupt | 358/80 |
| 4,145,709 | 3/1979 | Kelly | 358/6 |
| 4,152,068 | 5/1979 | Bickl et al. | 355/38 |
| 4,160,596 | 7/1979 | Joseph | 355/68 |
| 4,168,121 | 9/1979 | Freier et al. | 355/38 |
| 4,184,151 | 1/1980 | Iwata | 340/347 AD |
| 4,191,972 | 3/1980 | Matchell | 358/214 |
| 4,231,069 | 10/1980 | Wellendorf et al. | 358/256 |
| 4,263,001 | 4/1981 | Deutsch | 355/45 |
| 4,265,532 | 5/1981 | McIntosh | 355/20 |
| 4,344,699 | 8/1982 | McIntosh | 355/20 |

Primary Examiner—Richard A. Wintercorn
Attorney, Agent, or Firm—William D. Hall

[57] ABSTRACT

A color photoprinter having a scanning light source and automatic control of contrast excursion limits and exposure level is disclosed. The printer is particularly well suited to contact printing with opaque image receiving materials. A prescan of the original photographic transparency, only, is made to determine the initial exposure level and contrast excursion limits to be expected on the opaque receiving material, and to establish the required automatic exposure and dodging control signals. The original is rescanned to generate signals which represent an unsharp, luminous, contrast controlling mask. These signals are retained in a memory, such as an image storage tube. The opaque image receiving material is then moved into intimate contact with the original for the actual exposing scan, which takes place with the unsharp luminous mask electronically superimposed on the scanning light source, in order to provide automatic contrast and exposure level control of the image during the printing step. The use of combined intensity and velocity modulation to shorten the exposure time for the color exposure scan when using insensitive reproduction material is also disclosed.

30 Claims, 6 Drawing Figures

FIG. 1

FIG. 6

COLOR PHOTOPRINTING WITH A SCANNING MEMORY MASK

BACKGROUND OF THE INVENTION

This invention is an improvement in photographic printers used to make film or paper prints from either negative or positive color film transparencies. The usual object of photographic printing is to duplicate, as nearly as possible, the subject matter contained in the original. Scanning Cathode Ray Tube (CRT) printers have been widely used for many years to vary image contrast, by means of unsharp luminous masking, during exposure of the photographic reproduction. A scanning spot of light is employed because CRT beam intensity can easily be modified to provide instantaneous contrast control at any point within the printing stage format. CRT printers heretofore have not, however, been widely used for color printing because the light output obtainable from such a source has not been sufficient to provide photographic reproductions within commercially-acceptable exposure times. A printer employing a conventional shadow mask color CRT for example, might dissipate up to eighty percent of its electron beam power in the shadow mask structure, leaving a maximum of twenty percent for conversion to light useful for the color exposing process. Until now, a reversal color print made with a blended-phosphor CRT light source and relatively slow duplicating material has required an exposure time of between 5 and 30 minutes, depending upon the density of the original, which is unacceptable by most standards.

This invention is particularly adapted to work with current color print film or paper such as Eastman Kodak Aerochrome duplicating film Type 2447; Eastman Kodak Aerial Color Negative film, Type SO 149; Kodak 2203 RC print paper; Ciba-Geigy's Cibachrome color print paper, and similar materials. These particular emulsions are photographically slow when compared to conventional black and white printing materials and, moreover, are essentially opaque to transmitted light throughout most of the visible spectrum.

When trying to duplicate an original film as closely as possible, a contact printing process is normally preferred because of its higher speed and superior resolution, despite the fact that there may be a substantial gain in image contrast. Conversely, when printing by projection, the lens may be a source of image degradation, reduced contrast, and light loss, all of which can be avoided in a contact system. Scanning CRT printers frequently employ light transmitted through the raw stock to control the exposure level and/or contrast of the duplicating process, but this is extremely difficult with the aforementioned color reproduction materials, inasmuch as they transmit so little visible light.

The present invention is particularly well adapted for use with opaque color print film and paper materials, in a contact printing configuration, and is capable of providing automatic exposure level control and automatic modification of the image contrast range to fit within the contrast acceptance range of the receiving media.

PRIOR ART STATEMENT

U.S. Pat. No. 4,263,001 to Jeffrey T. Deutsch, which issued on Apr. 21, 1981, discloses a different way of attempting to achieve the same results as applicant's invention, but with a non-contact imaging system. Deutsch is particularly concerned about duplicating small transparencies with a single lens reflux (SLR) camera, presumably using modern camera films for the production of duplicate transparencies. Applicant's system may be distinguished from Deutsch's system in that it is normally used with a contact printer having, effectively, a single composite light spot for scanning the original film and exposing the duplicate. Deutsch uses a video camera to scan the original, and exposes the reproduction by means of a single shadow mask CRT. When operating with the same photographic duplicating material, applicant's invention is believed to be inherently at least an order of magnitude faster than Deutsch's, even if Deutsch were to employ extra-fast optics. Since most SLR macrocopying lenses are in the f2.5 to f3.5 range, applicant's invention would normally be forty or more times faster, using the same duplicating emulsion. Further, Deutsch consigns the critical functions of his invention to a box labeled "Electronic Image Modification" and does not attempt to described in any detail how his system would modify image contrast or exposure level.

U.S. Pat. No. 4,145,709 to Michael J. Kelly, issued on Mar. 20, 1979, is somewhat similar in structure to that which is claimed by applicant, but is quite different in its intended operation and result. Applicant's claims may be distinguished from the Kelly patent inasmuch as applicant claims one scanning light spot location for scanning the original and exposing the duplicate film. This same spot and location is employed for prescanning, memory storage, and exposure scanning. In the Kelly reference a vidicon camera tube is used to read the original, in place of applicant's scanning spot, and a separate and different scanning spot in a different location is used for the subsequent exposure.

With respect to both Kelly and Deutsch, it should be pointed out that using a single scanning spot location has inherent advantages in the accuracy of registration of the luminous contrast-controlling mask to the original image. In operation, the Kelly device is intended for use with black and white variable contrast photoprinting paper wherein the effective contrast grade is altered by the use of color filters to change the spectral content of the exposing light source. Applicant's device is intended for use with a color photoprinter and varies the printing contrast by forming and memorizing an electronic unsharp mask of the image and superimposing said mask, in luminous form, on the image during the printing exposure. Kelly dissects the original by scanning at one location, and recreates it by exposure at another, while applicant reads and scans at a single station and maintains optical coupling between the original and reproduction during exposure. Consequently, Kelly requires an enormous storage capacity to retain and transmit all of the scanned high resolution image information between his reading and exposing stations, whereas applicant needs only to store the signals representing the luminous unsharp mask which is to be applied to the exposure.

U.S. Pat. No. 4,265,532 to Walter L. McIntosh, one of the present applicants, was issued on May 5, 1981 and discloses the combination of an intensity modulated/velocity modulated (IM/VM) exposure mode which is also included in some dependent claims of this application. U.S. Pat. No. 3,400,632 to Wahli, issued Sept. 10, 1968, discloses a different approach to the provision of automatic contrast control in a CRT printer. Wahli also shows one embodiment in an intensity modulated system, and another embodiment in a velocity modulated system. However, he does not disclose a combination system wherein both intensity and velocity modulation are employed simultaneously.

U.S. Pat. No. 3,961,366 to Weishaupt, issued on June 1, 1976; and U.S. Pat. No. 4,191,972 to Matchell, issued on Mar. 4. 1980, each teach the use of a storage means with a video signal. The Matchell reference discloses the use of a single scan line storage means and a film scanner. The Weishaupt reference discloses a memory storage means in a photographic printer having a video camera to record an electronic image of the optically-projected original. A projected video image is superimposed on the projected optical image during the printing cycle. Applicant's invention uses a single scanning light source for both the prescan and the photographic exposure scan, whereas Weishaupt uses a vidicon for the prescan and a separate scanning spot for the photographic exposure. Applicants experimented with an arrangement similar to that disclosed by Weishaupt many years ago and found significant registration problems to be associated with projecting the second, contrast-modifying video image onto the optical image. Furthermore, because it can only add light, such projection can modify only one end of the contrast reproduction range, and not both. Finally, applicant's device in its preferred form is a contact printer, which inherently affords a higher degree of image fidelity than a projection printer can.

U.S. Pat. No. 4,168,121 to Freier et al, issued on Sept. 18, 1979; and U.S. Pat. No. 4,160,596 to Joseph, issued on July 10, 1979, each disclose a system for evaluating an original to be photographed or reproduced and comparing the original with a pre-determined parameter before printing or copying. Joseph evaluates reflectivity (exposure level) of the original to be copied, while Freir et al evaluate negatives, defined by snow or beach scenes, in a photofinishing printer. Neither reference teaches the use of a scanning spot which can alter the contrast of the printing reproduction, nor are they concerned with changing the image contrast limits to be applied to the photographic receiving media.

U.S. Pat. No. 4,231,069 to Wellendorf, issued on Oct. 28, 1980, teaches the conversion of an electronic mask to a digital form and the storage of same for subsequent manipulation. This reference is intended for use in video image-combining systems, and not in a scanning contact printer. Likewise, U.S. Pat. No. 4,184,151 to Iwata, issued on Jan. 15, 1980, discloses the conversion of an analog video signal to digital form. This reference is relevant to applicant's dependent claims which define digital conversion to produce a video mask. Neither reference, however, is intended for use in photographic printing.

U.S. Pat. Nos. 3,770,882; 3,851,094; and B344,203, now U.S. Pat. No. 3,928,719 all disclose film-to-video conversion devices involving the use of a scanning spot on a film original in order to create a video signal. Beyond that teaching, they are not relevant to the present application.

U.S. Pat. No. 3,926,520 to Kaufman, issued on Dec. 16, 1975, and U.S. Pat. No. 3,934,081 to Schumacher, issued on Jan. 20, 1976, each disclose a completely different type of contrast modification system for use in photographic printing. They are indicative of the general state of the art.

U.S. Pat. No. 3,571,493 to Baker, issued Mar, 16, 1971, discloses a photographic image interpretation device that uses laser beams to scan and form the image. This reference uses feedback signals derived from a mirror beam splitter to modulate the laser beams and thereby control the projected image contrast. It appears that the patent is intended to provide an image display device with contrast control, rather than a photoprinting device with contrast control.

OBJECTS OF THE INVENTION

It is an object of the present invention to provide a new color contact printer having automatic electronic dodging and exposure control for use with spectrally opaque, insensitive color duplicating materials.

It is another object of the present invention to provide a triniscope CRT light source for photoprinting and offering at least an order of magnitude more light output than has heretofore been available from a conventional blended-phosphor or shadow mask CRT.

It is yet another object of the present invention to provide an electronic evaluation of the transparency, by prescanning, in order to achieve accurate overall exposure control even with zero or partial dodging. The prescan electronic evaluation determines not only the required printing exposure level but also the contrast excursion limits of the color original to be duplicated.

It is a further object of the present invention to match or compare the density difference or contrast excursion limits of the original photography with the contrast characteristics of the photographic receiving media, and to automatically dodge the image during the printing step to insure that the original is faithfully reproduced within the contrast reproduction limits (i.e., the brightness acceptance range) of the photographic receiving media.

Yet another object of the present invention is to provide a combination intensity modulation and velocity modulation dodging system offering significantly more brightness and dodging flexibility than is available when using either IM dodging or VM dodging, alone.

It is an additional object of the present invention to provide a color contact printer particularly adapted for printing onto opaque photographic image receiving media, wherein a memory mask capability is employed. In this mode of operation the original color transparency is read transmissively, without any light loss or color shift due to the presence of the duplicating material in the optical path, and a modified density signal is generated thereby that represents the unsharp, luminous mask of the color original that is required to control the contrast and exposure of the reproduction.

It is also an object of the present invention to provide a mechanical means for use in a color contact printer that will allow the color image receiving media to be quickly positioned over the color original and then be held stationary and in intimate contact therewith, throughout the exposure of the photographic receiving media.

An additional object of the present invention is to provide a scanning light source having electronically-controlled spectral balance and brightness, and adaptable to the specific color-tracking requirements of the defined photographic emulsions over their usable exposure range.

DETAILED DESCRIPTION OF THE PREFERRED EMBODIMENT

Figure 1:
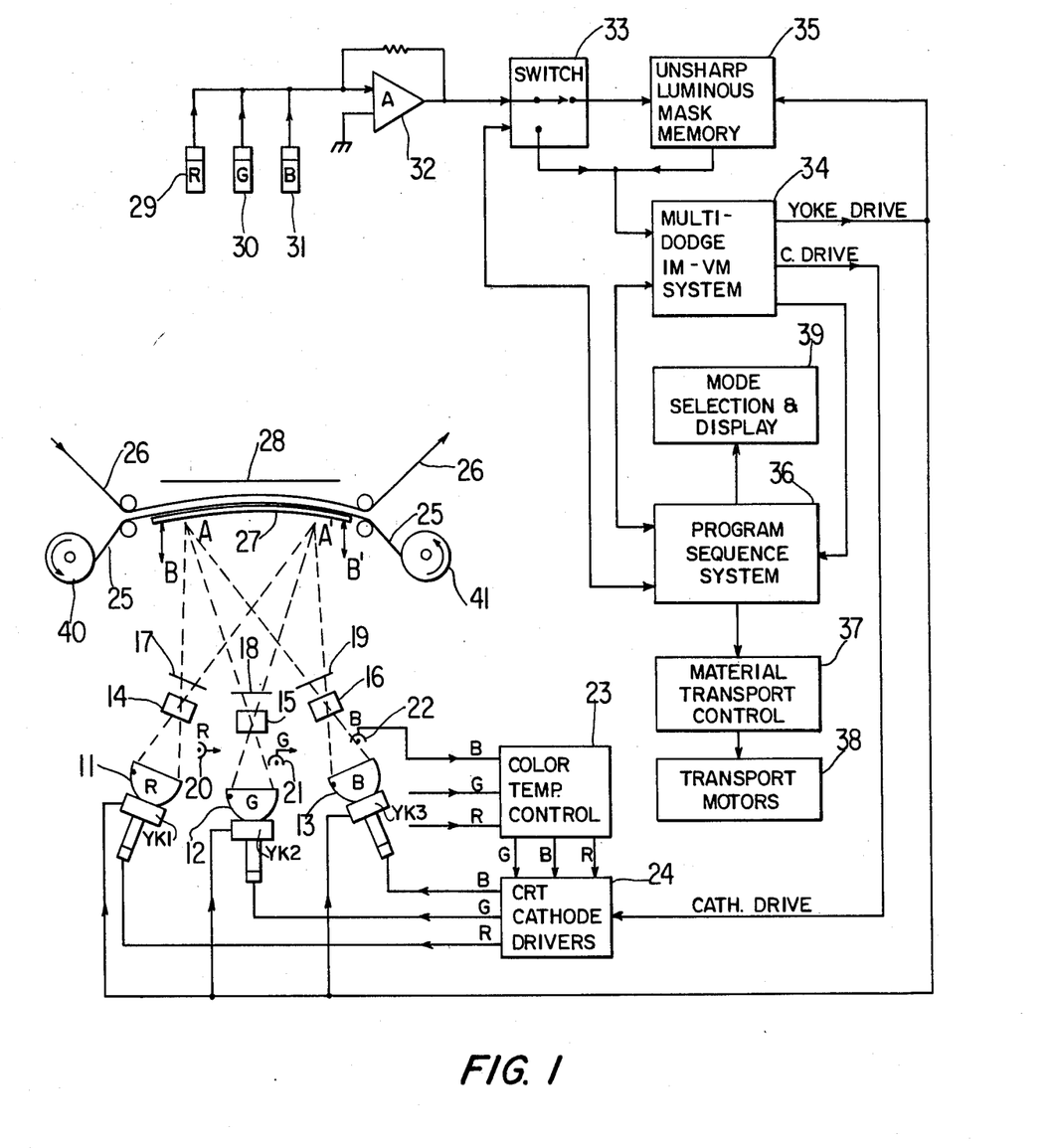

Traditionally, CRT printers having electronic dodging (i.e., masking) have relied upon a single cathode ray tube as the exposing light source. However, as indicated previously such printers, when equipped with a blended-phosphor CRT, may require excessive time to properly expose certain color printing media, be they film or paper, through the necessary color correcting filters. The present invention, as illustrated in FIG. 1, provides a three-CRT configuration, known as a triniscope, which is used in a manner similar to that which is currently popular in projection color television. The benefits of using the triniscope approach are several. The absolute light level of such a configuration is many times greater than that from a three gun shadow mask CRT because, in the latter, much of the beam input power is dissipated in the shadow mask structure and is thus unavailable at the phosphor screen. Secondly, the screen of each CRT in the triniscope is provided with a single continuous phosphor coating capable of emitting light of only one primary color: either red, blue, or green (or some other combination), as opposed to the discrete dot or bar-like screen structures which characterize conventional tricolor CRT's. Third, as compared to a blended-phosphor CRT, the triniscope confers the ability, within the contrast limits of each CRT, to provide dynamic color temperature control whereby the balance of red, green and blue printing light can be established for appropriate photosensitive raw stock, and be maintained over an equivalent neutral density (END) range of 0.0 to 2.0 as detected by the associated brightness control sensors, without recourse to color-correcting filter packs in the light path. In the invention illustrated in FIG. 1, the triniscope has four different possible modes of operation. The first is a viewing mode in which all CRTs are driven at high intensity and with a fast raster scan to enable the operator to view from above, and via transmitted light, the transparency which is to be reproduced. The second mode of operation is the prescan mode, during which a density assessment of the transparency image is made using only a controlled amount of intensity modulated dodging. During this assessment, a $D_{min}$ signal is generated which represents the minimum density of the transparency (or negative); a $D_{max}$ signal is generated which is indicative of the maximum density of the transparency; a $\Delta D$ signal is derived which defines the difference between the minimum and maximum densities present in the transparency; and an integrated $D_{sum}$ signal is generated, representing the required printing exposure level.

The third mode of operation is a memory mask scan in which the color original is scanned by the light source, using the density assessments made during the prescan, to generate a modified density-related signal representative of the unsharp luminous mask actually required for use with the original transparency. During this memory scan, although simultaneous intensity modulation and velocity modulation of the light source could be present, in the preferred case only intensity modulation is employed. After completion of the memory scan mode, the color image receiving material is brought into intimate contact with the color original.

Finally, during the fourth or exposure mode, the modified density signals generated during the memory mask scan are used to control the exposure and to generate the luminous unsharp contrast reducing mask which is superimposed on the original photographic image during exposure of the image receiving media. Both intensity modulation and velocity modulation are available during this mode, to substantially increase the printing speed. It should be noted that during the prescan, memory scan and exposure scan, the original is not moved and registration between the raster generated by the CRT light source and the image details of the color original remains constant.

Referring to FIG. 1, the triniscope is comprised of three CRTs 11, 12 and 13, with associated projection lenses 14, 15 and 16. These lenses are not necessarily of image forming quality, their primary function being to collect maximum light while adding minimum flare. Each CRT may also be provided with a single sharp-cut band pass filter 17, 18 or 19 to minimize color contamination and maximize the spectral purity of the individual phosphors. Note that additional color filtration is no required because the spectrum of the triniscope exposing light source is adjustable for various types of color printing by modification of the relative ratios of emission from the individual CRT's, with the latter being typically centered at about 450 nm, 530 nm, and 620 nm. This is equivalent to the conventional blue, green and red printing lights. Alternate phosphor selections or colors may be defined to enable the most efficient exposing speed and spectral balance to be reached with color photosensitive materials other than those mentioned herein.

Red, green and blue color-temperature photosensors 20, 21 and 22 are provided with feedback paths through color temperature control 23 which can modify the response of the CRT cathode drivers 24. The blend of light from the individual CRT's of the triniscope is controlled by the use of a local electronic negative feedback loop around each CRT whereby the blue-green and red-green emissions may be matched in some operator-selectable proportions. The summed intensity of all three emissions will then be held at a constant level, despite changes in the blue-green or red-green ratio, by the feedback action. Thus, the source color temperature will be adjustable in spectrum without changing its intensity. When the density of the color transparency being exposed requires a change in source intensity, electronic shaping circuits may modulate the color blend and generate the required change in light source color temperature over the range of densities sensed in the transparency. The triniscope provides, as its end product, a light source which can be electronically balanced to "white". This light source scans from Position A to Position A', as illustrated in FIG. 1, in a conventional raster format. As seen from above, the light source appears to be a single spot of light which, when driven at a scan rate above the persistence of vision, approximates a continuous white light area viewing source. By virtue of color temperature control 23, the spectral balance of the white light scanning spot may be adjusted for the known spectral characteristics of the photographic receiving media or the color original, or both.

The system illustrated in FIG. 1 is essentially in an exposing mode, with the original color transparency forming one continuous strip 25 and the photographic image receiving media represented as a second continuous strip 26. The color original and the color image receiving media may be urged into intimate contact, prior to commencement of the exposure, by means of a movable transparent stage plate 27 which reciprocates vertically along the path indicated by arrows B and B'. The photographic image receiving media is normally housed in a light-tight movable carriage as will hereinafter be described. Above the stageplate and the color original there is a diffusion filter 28 used to diffuse the specular characteristic of the scanning light spot during the prescan and memory scan modes of operation.

Figure 6:
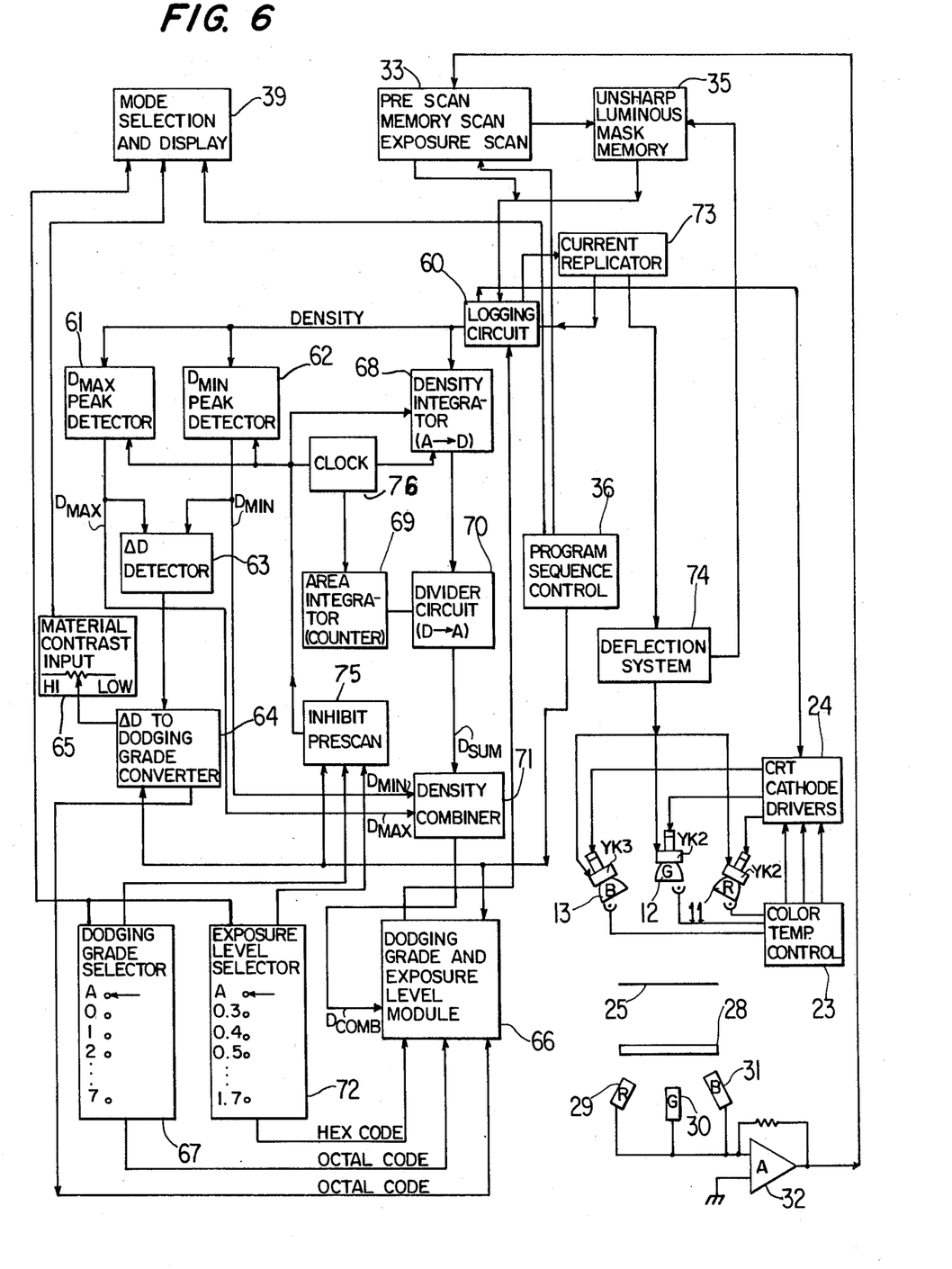

During the view, prescan, and memory scan modes, color receiving media 26 is stored in the dark and out of the triniscope light path. During the prescan mode, an assessment of the image to be reproduced is made by the red, green and blue photodetectors 29, 30 and 31. During this assessment, neutral diffuser 28 is placed in the optical path adjacent to, but not necessarily in intimate contact with, the original transparency 25. Thus, as can be seen from FIG. 1, the projected scanning spot impinges upon the transparency and is then viewed, through diffuser 28, by photodetectors 29-31. This diffuser is used to eliminate Callier effect problems by converting specular densities to equivalent diffuse densities. The photodetectors 29-31 are positioned sufficiently distant from the printing stage to minimize $\cos^4$ light pickup non-informity difficulties. At a distance of 42", for example, the relative pick-up error will be about 0.02 density units. The composite prescan mode photodetector output is directed, via amplifier 32 and prescan/memory scan and exposure scan switch 33, to the MultiDodge IM/VM system 34, wherein the various image densities are assessed.

The MultiDodge IM/VM system will be discussed in greater detail with respect to FIG. 6. However, its main purpose is to generate a $D_{max}$ signal indicative of the maximum density of the original; a $D_{min}$ signal representing the minimum density existing in the original; and a $\Delta D$ signal indicative of the general exposure level of the original transparency. These densities are evaluated and combined to produce two exposing constraints, namely: exposure Level, and Dodging Grade.

After the prescan mode a memory scan, initiated by program sequence system 36, causes the prescan/memory scan and exposure scan switch 33 to route the output of photodetectors 29-31 to an unsharp luminous mask memory 35, which may take the form of an image storage tube such as the Princeton PEP-500 Lithocon Solid State Image Memory sold by Princeton Electronic Products, Inc., North Brunswick, New Jersey 08902, or similar. During the memory scan the neutral diffuser 28 is still present in the light path, and the photodetector output signals are routed to the mask memory and simultaneously to the MultiDodge IM/VM system. Because the MultiDodge system produces both CRT cathode and deflection yoke drive signals based on the previously mentioned exposure level and dodging grade constraints, the triniscope light source will dynamically change its intensity and color balance to the designated and desired characteristics. The raster scan will trace out addressable points which are simultaneously identified in the unsharp luminous mask memory 35. Thus, density differences in the dodged image are sensed via photodetectors 29-31 and stored in mask memory 35 as modified density-related signals.

Upon completion of the memory scan, the electronic system pauses to allow photographic image receiving material 26 to be displaced from its light tight housing and be physically positioned over transparency 25. The movable platen 27 then ensures intimate contact between the color original 25 and the photographic receiving media 26. This movement of the photographic material is initiated by the program sequence system 36, through the material transport control 37. After intimate emulsion to emulsion contact is assured, the program sequence system moves to the expose cycle, the signal from photodetectors 29-31 is disabled via switch 33, and the modified density related signals stored in the mask memory 35 are used to control the MultiDodge IM/VM system 34 during the subsequent expose cycle. When the exposure is complete, the CRT's are blanked off, the vertically-reciprocating platen 27 is lowered from its location above the plane of original 25, the raw stock 26 recesses into its light tight storage carriage and, if the system is in a search/print mode, the printing cycle ends. However, if the printer is in a repeat printing mode, platen 27 will lower after each exposure, an appropriate amount of raw stock will be advanced by transport motors 38, platen 27 will rise again to establish contact between the materials, and a new exposure cycle will be initiated without either a new prescan or a new memory scan cycle having taken place. The operation of the mode selection and display system 39 will hereinafter be described in detail with respect to FIG. 6.

Figures 2, 3, 4:
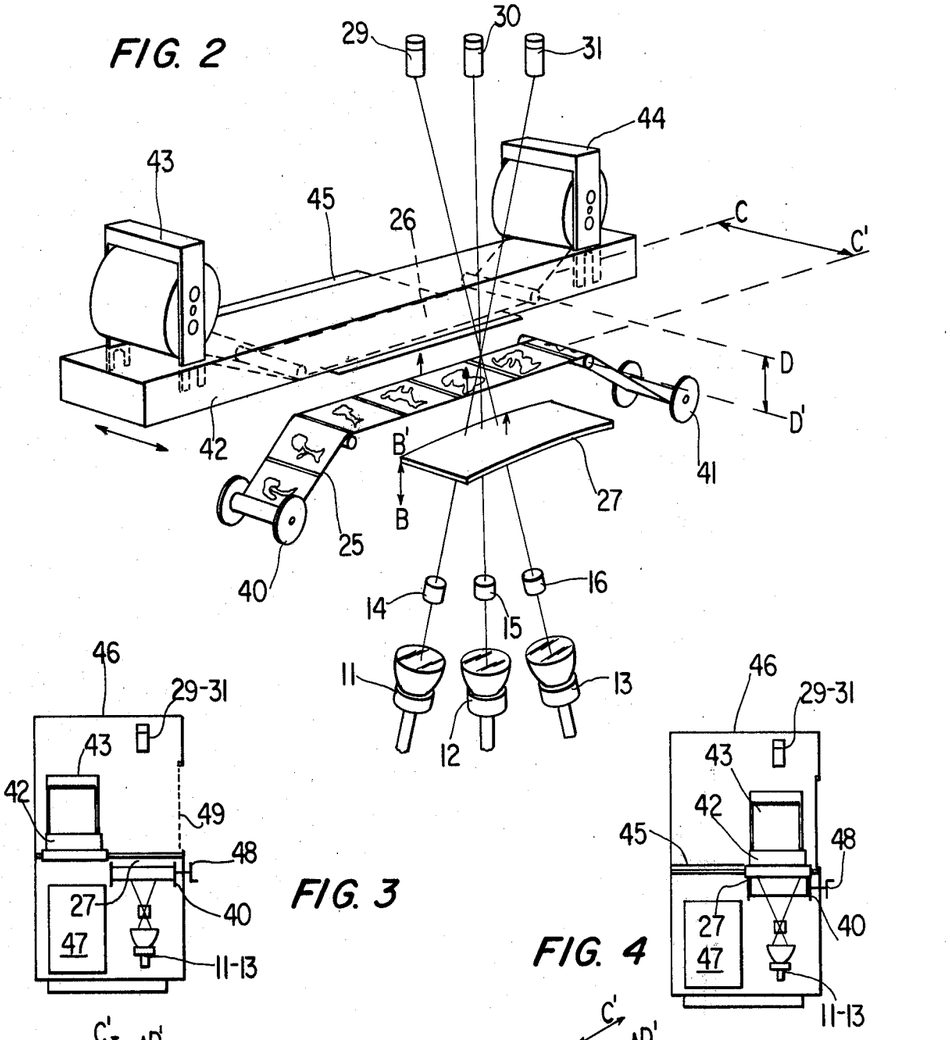

Referring to FIG. 2, the color transparencies or negatives 25 normally take the form of a long continuous strip of original photography stored on transport spool holders 40, 41. The transparencies are normally sequentially advanced between individual steps of the printing and search mode. However, if desired, the printer can be caused, through mode selection and display system 39, to advance the color transparencies frame by frame and to make one or more copies of each.

The photographic receiving media 26 is stored in a light tight carriage assembly 42 having a raw stock supply cassette 43 and take-up cassette 44. A dark slide 45 closes the lower-most portion of the carriage assembly 42 to prevent any extraneous light from reaching photographic receiving media 26. As indicated previously, this media may be either negative or positive-working color print film, or it may be a color print paper intended for printing from either positives or negatives. Carriage 42 is particularly adapted for movement along two axes, illustrated as C and C' horizontally, and D and D' vertically, in FIG. 2. After completion of the memory scan, the carriage is brought forward laterally along axes C-C' until it is positioned directly over the selected color original 25. At this time, the dark slide 45 becomes withdrawn from carriage 42 and the entire carriage assembly is lowered along axes D-D', as illustrated in FIG. 2. As carriage 42 is reciprocated downward, the transparent stageplate 27 reciprocates upward along the axes indicated at B-B'. The interrelationship of the movement between carriage assembly 42 and transparent platen 27 will hereinafter be further described with respect to FIG. 5.

Figure 5:
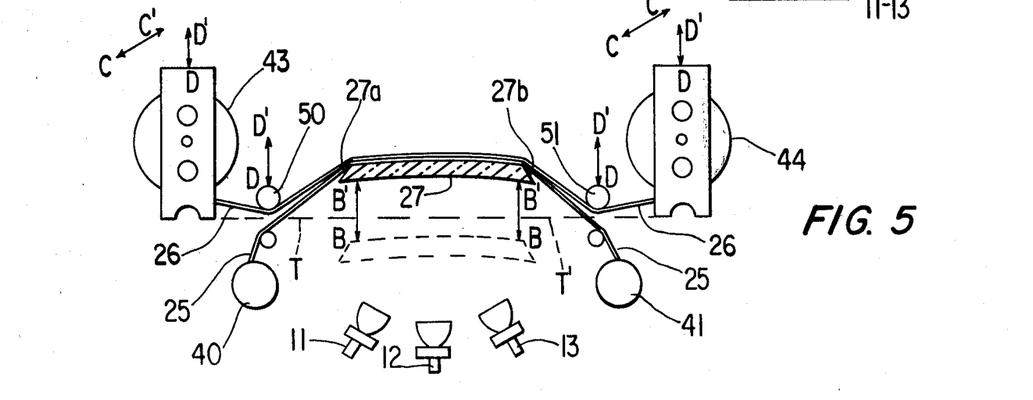

The lateral movement path of carriage 42 can be seen in FIGS. 3 and 4, which disclose the color contact printer in the viewing/prescan mode (FIG. 3) and in the exposure mode (FIG. 4). In FIG. 3, a light-tight exterior cabinet 46 is provided with movable doors 47 which are opened for viewing of the transparency over transparent stageplate 27. As indicated previously, during the view mode, the CRT light source operates at a high scan rate and with high intensity to provide a continuous white light for viewing purpose. The electronic packages are stored in cabinet 47 and photodetectors 29-31 are mounted in the upper portion of cabinet 46. Takeup spools 40, 41 may be manually controlled by means of handle cranks 48 or they may be remotely driven by torque motors (not shown). In the illustration of FIG. 4, the light-tight carriage assembly 42 has been moved over transparent stageplate 27, and doors 49 of cabinet 46 have been closed. The contact printer is now in position for the initiation of a single exposure, or for making multiple exposures in the step-and-repeat mode. Not withstanding the foregoing, nothing precludes an operational mode using cut sheet originals and raw stock. FIG. 5 is a diagrammatic view of the interrelationship between the movable platen 27, the photographic original 25 and the photographic receiving media 26. During contact printing, it is essential that the original and the receiving media remain in intimate emulsion-to-emulsion contact throughout the entire area to be imaged. This is accomplished by lowering receiving media 26 along the axes illustrated as D'-D, wherein a pair of parallel transport rollers 50, 51 define, on their lower tangent with media 26, a plane indicated by dotted line T-T'. As the photographic image receiving media 26 is tensioned between rollers 50, 51 and lowered towards original photography 25, the transparent stageplate reciprocates upward along the axes indicated by B-B' to bring the color original and color receiving media into intimate contact. The edges 27a, 27b of the transparent stageplate, in a direction transverse to the direction of material transport, are chamfered to eliminate any possibility of locally stressing or damaging color materials 25, 26. The relative movement between stageplate 27 and rollers 50, 51 has been greatly exaggerated in FIG. 5 for purposes of clarity in explaining the system concept. It is important to note, however, that the tensioning surface of transparent stageplate 27 rises above the horizontal plane T-T' defined by horizontal rollers 50, 51 and that, once a desired frame of photography 25 has been identified for reproduction and correctly aligned by the operator over stageplate 27, there must be no further change in the position of material 25 despite subsequent reciprocation of the stageplate. The operation of the MultiDodge IM/VM system, which will now be described with respect to FIG. 6, is more fully described in the copending U.S. patent application Ser. No. 270,758, filed on June 5, 1981, now U.S. Pat. No. 4,344,699, granted Aug. 17, 1982, to Walter McIntosh, a co-inventor in the instant application. As shown in FIG. 6, the outputs from photomultipliers 29-31 are indicative of the densities existing in color original 25 at any instantant during a raster scan. This signal is amplified at 32 and routed through the prescan/exposure scan and memory scan switch 33 to a logging circuit 60, and from the output of said logging circuit to a $D_{max}$ peak detector 61 which determines the maximum density of color original 25, and to a $D_{min}$ peak detector 62 which detects the minimum density of color original 25. The output of the $D_{min}$ and $D_{max}$ detectors is summed in the $\Delta D$ detector 63 to determine the maximum density range of color original 25. Thus, during prescan the system evaluates the color original to determine a $D_{min}$ signal representative of a minimum density in the transparency, a $D_{max}$ signal representative of the maximum density in the transparency, and a $\Delta D$ signal representative of the difference between $D_{min}$ and $D_{max}$. After $\Delta D$ has been determined by prescanning it is compared, in dodging grade comparative circuit 64, to a preset value that corresponds to the contrast acceptance range of the photographic receiving media 26 installed in the printer. The comparative dodging grade converter circuit 64 seeks to establish only sufficient IM/VM contrast correction to enable correct reproduction of the $\Delta D$ range of transparency 25 on reproduction material 26. The contrast excursion range selected by the comparative circuit takes the form of one diode pair chosen from among a group of diode pairs located in dodging grade and exposure level module 66. These diode pairs, and their precise mode of selection, are similar to diode pairs 133-138 shown in FIG. 6 of McIntosh U.S. Pat. No. 4,265,532 except that seven different contrast excursion ranges are provided in the MultiDodge System. The $\Delta D$ to dodging grade converter 64 enables the system to automatically select the diode pair which provide the least amount of dodging required to maintain the exposing image within the contrast acceptance limits of image receiving material 26, as determined by the preset value entered by the operator by adjustment of a calibration control within material contrast control circuit 65. The MultiDodge System is also equipped with mode selection and display unit 39 having a plurality of indicator means which provide the operator with densitometric readouts of $D_{min}$, $D_{max}$, $\Delta D$ and the contrast excursion range that the prescan system has determined to be most appropriate for reproduction of the original just analyzed. The operator can, if desired, compare the recommended amount of dodging with the densitometric data and make an independent choice as to the actual amount of dodging to be employed. If the operator determines that a different range of dodging is desirable, that range can be entered by means of doging grade selector 67.

The prescan system also automatically determines signals representing two separate exposure levels. The first such signal is $D_{sum}$ which is derived by: $D_{sum} = 1/n (D_1 + D_2 \ldots D_n)$ from density integrator circuit 68, area integrator (counter) 69, and divider circuit 70. This is an average sum of all density points sampled during the prescan and can be used to determine the proper exposure level for each original evaluated by the prescan system. The present invention also provides a means for generating a $D_{comb.}$ signal as follows: $D_{comb.} = (1-K) D_{sum} + (1-k) K D_{min} + K (k) D_{min} D_{max}$. K and k are variable impedance means in density combiner circuit 71 that enable the operator to bias the exposure level toward $D_{sum}$, $D_{min}$, $D_{max}$, or $D_{average}$, as desired. Aerial reconnaissance photography might well be biassed to $D_{sum}$, particularly when a photomosaic is being constructed, but pictorial photography is more likely to be biassed toward $D_{min}$ or $D_{max}$, depending upon whether it is of a "high key" or a "low key" image. This system provides a readout through mode selection and display system 39 to enable the operator to chose between the automatic exposure level determined by the system and one of the exposure levels controlled by manual adjustment of exposure level selector 72. The exposure level automatically determined by density combiner 71, or manually entered at selector 72, is then combined with contrast excursion range data determined by the $\Delta D$ to dodging grade comparator circuit 64 and dodging grade and exposure level module 66, or via operator intervention through the use of dodging grade selector 67, to provide an exposure midpoint through logging circuit 60 and current replicator 73. When the dodging grade and exposure level are manually selected, the inhibit prescan circuit 75 is also actuated to prevent a prescan, and the system clock 76 is inhibited.

After completion of the prescan, a memory scan may be initiated which combines intensity and velocity modulation of light source 11-13. By means of logging circuit 60, the output current of photodetectors 29-31 is modified to maintain it within the exposure requirements determined by dodging grade and exposure level module 66, and is replicated by current replicator 73 to automatically modulate both the triniscope intensity, through cathode drive circuit 24, and the beam sweep velocity, through deflection system 74. In the present invention, both intensity modulation and velocity modulation (or dwell time modulation) are employed, although the invention is also applicable to an IM only system, to a VM only system, or to a dwell time only system. As was mentioned previously, the prescan mode employs IM only, while the exposure mode may employ both IM and VM control, in combination, or IM and dwell time control, in combination.

The mode selection and display system 39 will provide an exposure level indication, an exposure value indication, and a contrast grade indication, all as determined during the prescan, or as was arbitrarily determined by operator adjustment of dodging grade selector 67 and/or exposure level selector 72. The exposure level is defined as the midtone density of the original image which is to be reproduced. As was indicated earlier with respect to density combiner circuit 71, a variety of information may be utilized, including $D_{max}$, $D_{min}$, and $D_{sum}$, or any combination thereof. In a preferred embodiment, exposure level (E.L.) will be determined by the following balance of densities: E.L.=($\frac{1}{4}$) $D_{max}$+($\frac{1}{4}$) $D_{min}$+($\frac{1}{2}$) $D_{sum}$. The exposure value represents the amount of exposure required to accomodate the photographic speed of the image receiving media 26, and may be entered into the system via a two decade thumbwheel switch at unit 72. The contrast grade is a measure of the luminous masking range actually applied by the MultiDodge System as a function of that which is required, and will be based upon the density range measured in the original and the known (calibrated) contrast characteristics of rawstock 26. The contrast grade may be entered manually, or it may be derived from the prescan measurement, at the user's option. As indicated previously, it may be compared with the contrast characteristics of the photographic receiving media as entered into the system via material contrast input 65. During the exposure mode, the color contact printer will control reproduction contrast in two ways: (a) by changing the intensity of the light source scanning beams; (b) by changing the velocity of the light source scanning beams.

For the purpose of this application, image contrast is divided into "gross" and "detail", i.e., image density differences over large and small areas, respectively. Heretofore, in electronically dodged reproductions the detail contrast has been increased at the expense of a reduction in gross contrast. In other words, areas which are large when compared to the size of the scanning spot are exposed only sufficiently to reach a midtone reproduction density, lying on the straight line portion of the D-LogE curve of the reproduction material. Detail contrast is thereby increased because the straight line portion has a contrast gradient greater than that of the toe and shoulder regions of the emulsion transfer characteristic. The MultiDodge System, however, employs a form of contrast control wherein dodging commences at a selectable midtone and extends outward therefrom to higher and lower densities.

A dodging grade of 0 entered in the dodging grade selector 67 is arranged to provide no dodging. All other settings of the dodging grade control result in predictable amounts of dodging, i.e., dg=1 results in density compression between 0.12 sensed density units (du) above, and 0.12 sensed density units below the midtone exposure level setting. Therefore, at dg=1 (assuming the exposure level (E.L.) to be 1.2 du) no dodging will occur from 0du to 1.08 du, full dodging will occur from 1.08 du to 1.32 du, and again there will be no dodging from 1.32 du to all higher densities. Similarly, at dg=2 compression will occur over a range of ±0.25 du; thus, at e1=1.2, no dodging will occur from 0du to 0.95 du, full dodging will be obtained from 0.95 to 1.45 du, and there will be no dodging from 1.45 du to all higher densities. Continuing, at dg=3, compression will occut at ±0.38 du; at dg=4, compression will occur over ±0.5 du; at dg=5, compression will occur over ±0.6 du; at dg=6, compression will be over the range of ±0.88 du and, lastly, at dg=7, compression by dodging will occur over the entire sensed density range. As an illustration, if the sensed density range determined the original image by ΔD detector 63 is 1.8 and the reproduction gamma of the rawstock is known to be 1.5; and if the required reproduced density range is also to be 1.8, then the compression required is (1.5×1.8−1.8=2.7−1.8−0.9=±0.45); thus, a setting of dg 4 is required in order to keep the reproduction densities within the contrast acceptance limits of the rawstock. In summary, the color contact printer of the present invention provides automatic control of the exposure level, and of the contrast gradient selected and applied to the photographic receiving media, while also producing a substantial increase in printing speed over the known prior art devices. Furthermore, the memory mask concept enables operation with reproduction materials which are substantially opaque to the exposing radiation.

Note that by inverting the polarity of signals fed to mask memory 35, the density range of low contrast original photography may be enhanced during the main exposure mode. Also, while the cathode ray tube has been cited as a light source of particular utility in practicing this invention, those skilled in the art will recognize that other scannable light sources, such as lasers, may be employed without departing from the inventive concept as set forth in the claims which follow.

We claim:

1. A color contact printer for exposing an image receiving media from an image carrying media with a scanning spot of radiant energy, wherein said image receiving media is substantially opaque to at least one spectral component of said radiant energy, said printer comprising:
   a. a single means for scanning said image carrying media with at least one scanning spot of radiant energy, said means subsequently being used to expose said image receiving media;
   b. at least one photosensor means for measuring the radiant energy passing through the image carrying media, to generate density-related signals;
   c. means responsive to said density-related signals for modulating said scanning spot to modify the effective contrast range and exposure level of said density-related signals;
   d. luminous mask memory means for storing said modified density-related signals, said signals representing a density-corrected luminous mask of said image;
   e. means for bringing said opaque image receiving media into intimate contact with said image carrying media after said luminous mask memory scan has been completed;
   f. means for exposing said image receiving media through said image carrying media with said scanning spot of radiant energy, said exposing scan having said density-corrected luminous mask superimposed thereon to alter the exposing effect of said scanning spot to provide a density-corrected image on said image receiving media.

2. A color contact printer as claimed in claim 1 wherein said means for exposing said image further includes:
   a. replicator means for producing predictably related first and second output currents in response to the modified density-related signal that represents the luminous mask of said image;
   b. modulator means responsive to said first output current to modulate the intensity of the beamed spot of radiant energy in response to variations in said first output current;
   c. deflection control means responsive to said second output current to modulate the velocity or dwell period of said beamed spot of radiant energy in response to variations in the second output current;
whereby both the beamed spot intensity and the spot velocity or the spot dwell time are varied in response to variations in the modified density-related signal that represents the luminous mask of said image.

3. A color contact printer as claimed in claim 1 wherein said means responsive to said density-related signals further includes;
   a. prescan circuit means for establishing a $D_{min}$ signal representative of the minimum density of the image carrying media; a $D_{max}$ signal representative of the maximum density of the image carrying media; a $\Delta D$ signal representative of the difference between $D_{min}$ and $D_{max}$; and a $D_{sum}$ signal representative of the sum of the densities sampled during the prescan;
   b. comparative circuit means for automatically comparing the $\Delta D$ signal to a preset value representative of the image contrast acceptance range of the image receiving media and generating a contrast excursion range signal;
   c. control means responsive to said $D_{sum}$ density level signal and said contrast range signal to set the exposure level and contrast excursion range of said beamed spot during the luminous mask memory scan of said image carrying media.

4. A color contact printer as claimed in claim 2 wherein said means responsive to said density-related signals further includes:
   a. prescan circuit means for establishing a $D_{min}$ signal representative of the minimum density of the image carrying media; a $D_{max}$ signal representative of the maximum density of the image carrying media; a $\Delta D$ signal representative of the difference between $D_{min}$ and $D_{max}$; and a $D_{sum}$ signal representative of the sum of the densities sampled during the prescan;
   b. comparative circuit means for automatically comparing the $\Delta D$ signal to a preset value representative of the image contrast acceptance range of the image receiving media and generating a contrast excursion range signal;
   c. control means responsive to said $D_{sum}$ density level signal and said contrast range signal to set the exposure level and contrast excursion range of said beamed spot during the luminous mask memory scan of said image carrying media.

5. A color contact printer as claimed in claim 1 wherein said luminous mask memory means is a storage tube having a plurality of microcapacitor memory elements, or the like.

6. A color contact printer as claimed in claim 1 wherein said luminous mask memory means further comprises an analog to digital converter and a digital storage means.

7. A color contact printer as claimed in claim 1 wherein said means for bringing said image receiving media into intimate contact with said image carrying media further includes:
   a. carriage means for transporting said image receiving media from a first position adjacent said image carrying media to a second position immediately above said image carrying media;
   b. a transparent stage plate means mounted below said image carrying media, said stage plate having a first position out of contact with said image carrying media, and a second position in which it urges said image carrying media into intimate contact with said image receiving media.

8. A color contact printer as claimed in claim 4 wherein said means for bringing said image receiving media into intimate contact with said image carrying media further includes:
   a. carriage means for transporting said image receiving media from a first position adjacent said image carrying media to a second position immediately above said image carrying media;
   b. a transparent stageplate means mounted below said image carrying media, said stageplate having a first position out of contact with said image carrying media, and a second position in which it urges said image carrying media into intimate contact with said image receiving media.

9. A color contact printer as claimed in claim 4 wherein said luminous mask memory means is a storage tube having a plurality of microcapacitor memory elements, or the like.

10. A color contact printer for exposing opaque photographic material to photographic images by scanning said images with a plurality of cathode ray tubes (CRT's), said printer comprising:
   a. a light source having first, second and third CRT's, said first CRT having a red emitting phosphor screen, the second a green emitting phosphor screen, and the third a blue emitting phosphor screen, said light source also having a projecting lens for each CRT to enable the combined beams from the three CRTs to be focussed into a single scanning spot;
   b. at least one photosensor means for measuring a portion of the light from the scanning spot after it has been modulated by the photographic image, to generate a density related signal therefrom;
   c. a first memory scan means for scanning said photographic image, said memory scan means having a first control means responsive to said density related signal to modify the effective contrast range and exposure level of said scanning spot, said memory scan means further having a storage means for storing the modified density related signals obtained during the memory scan, said signals representing a density corrected luminous mask of said image;
   d. carriage means for bringing said opaque photographic material into intimate contact with said photographic image after completion of said memory scan;
   e. exposure scan means for exposing said photographic material with said scanning spot, said exposure scan having a second control means responsive to the modified density-related signal stored in said storage means to superimpose upon said imaging scan a luminous mask of the image obtained during the memory scan, said exposure scan thereby having a corrected exposure level and corrected contrast excursion range, for exposing said photographic material.

11. A color contact printer as claimed in claim 10 which further includes a color temperature control for altering the respective balance of said red, blue and green CRT light emissions, whereby the combined light from said CRTs may be balanced to the spectral sensitivity of a specific emulsion batch of said photographic material.

12. A color contact printer as claimed in claim 10 which further includes a prescan means for scanning a predetermined portion of said photographic image prior to said memory scan, said prescan means responsive to a predetermined value representative of the contrast acceptance range of the photographic image receiving material to generate an automatic exposure level and contrast excursion range for the density modified signal obtained during said memory scan.

13. A color contact printer as claimed in claim 10 wherein said exposure scan means further includes:
   a. replicator means for producing predictably related first and second output currents in response to the modified density-related signal that represents the luminous mask of said image;
   b. modulator means responsive to said first output current to modulate the intensity of the combined scanning spots from said CRTs in response to variations in said first output current;
   c. deflection control means responsive to said second output current to modulate the velocity or dwell period of said combined scanning spots in response to variations in the second output current;
whereby both the scanning spot intensity and the spot velocity or the spot dwell time are varied in response to variations in the modified density-related signal that represents the luminous mask of said image.

14. A color contact printer as claimed in claim 12 wherein said exposure scan means further includes:
   a. replicator means for producing predictably related first and second output currents in response to the modified density-related signal that represents the luminous mask of said image;
   b. modulator means responsive to said first output current to modulate the intensity of the combined scanning spots from said CRTs in response to variations in said first output current;
   c. deflection control means responsive to said second output current to modulate the velocity or dwell period of said combined scanning spots in response to variations in the second output current;
whereby both the scanning spot intensity and the spot velocity or the spot dwell time are varied in response to variations in the modified density-related signal that represents the luminous mask of said image.

15. A color contact printer as claimed in claim 14 which further includes a color temperature control for altering the respective balance of said red, blue and green CRT light emissions, whereby the combined light from said CRTs may be balanced to a specific emulsion batch of said photographic material.

16. A color contact printer as claimed in claim 1 wherein said memory scan storage means is a storage tube having a plurality of microcapacitor memory elements, or the like.

17. A color contact printer as claimed in claim 10 wherein said memory scan means further comprises an analog to digital converter and a digital storage means as said storage means.

18. A color contact printer as claimed in claim 10 wherein said means for bringing said photographic material into intimate contact with said photographic image further includes:
   a. light-tight carriage means for transporting said photographic material from a first position adjacent said photographic image to a second position immediately over said photographic image;
   b. a transparent stageplate means mounted below said photographic image, said stageplate having a first position out of contact with said photographic image, and a second position in which said photographic image is urged into intimate contact with said photographic material.

19. A color contact printer as claimed in claim 18 wherein said carriage means further defines first and second transport rollers mounted in parallel relationship on opposite sides of said photographic image path when said carriage is in its second position, said stageplate being curved and capable of reciprocation between its first and second positions, whereby said stageplate will reciprocate upwardly between said parallel transport rollers to its second position, with the curvature of said stageplate above the plane defined by the axes of said parallel rollers.

20. A color contact printer for exposing an opaque photographic material from a color original with a scanning spot light source, said printer comprising:
   a. CRT means for scanning said color original with a scanning spot of light, said means having separate gain controls for adjusting the relative intensity of the three primary colors of light to be generated by said means;
   b. at least one photosensor means for measuring the light passing through said color original to generate density-related signals therefrom;
   c. prescan means responsive to said density-related signals for modulating said scanning spot to modify the effective contrast range and exposure level of said density-related signals, said means generating during prescan a $D_{min}$ signal representative of the minimum density of said color original, a $D_{max}$ signal representative of the maximum density of said color original, a $\Delta D$ signal representative of the difference between $D_{min}$ and $D_{max}$, and a $D_{sum}$ exposure level signal;
   d. comparative circuit means for automatically comparing the $\Delta D$ signal to a preset value representative of the contrast acceptance range of said opaque photographic material to be exposed, said means generating thereby a contrast excursion range signal;
   e. memory scan means for scanning said original with said scanning spot and storing a modified density-related signal generated thereby in an image storage tube, said scanning spot being modified by said $\Delta D$ signal and said $D_{sum}$ signal during said memory scan to generate a density corrected luminous mask of said original;
   f. means for bringing said opaque photographic material into intimate contact with said color original after completion of said memory scan;

g. exposure scan means for exposing said opaque photographic material with said scanning spot after it has passed through said color original, said exposure means responsive to said stored, modified, density-related signal to generate an exposing scan having a density-corrected luminous mask superimposed thereon to alter the exposing effect of said beam spot and thereby provide a density corrected image on said opaque photographic material.

21. A color contact printer as claimed in claim 20 which further includes means to modulate both beam intensity and beam velocity during the exposure scan.

22. A color contact printer as claimed in claim 20 which further includes means to modulate both beam intensity and spot dwell time during the exposure scan.

23. A color contact printer as claimed in claim 20 wherein said memory scan means includes an image storage tube having a plurality of microcapacitors therein for storage of said modified density signal.

24. A color contact printer as claimed in claim 20 wherein said means for bringing said image receiving media into intimate contact with said image carrying media further includes:
    a. carriage means for transporting said image receiving media from a first position adjacent said image carrying media to a second position immediately above said image carrying media;
    b. a transparent stageplate means mounted below said image carrying media, said stageplate having a first position out of contact with said image carrying media, and a second position in which it urges said image carrying media into intimate contact with said image receiving media.

25. A method of automatically modifying the exposure level and contrast excursion limits for a color contact printer wherein an opaque photographic receiving media is used, said method comprising:
    a. positioning a color original to be duplicated over a scanning spot light source, said light source having means to vary the respective blue, red and green components of said light;
    b. prescanning said original with said scanning spot while measuring the light passing through the original to determine its minimum and maximum density, the maximum density of the material, the difference between said minimum and maximum densities ($\Delta D$) and its average density;
    c. comparing the $\Delta D$ value to a predetermined reference value to generate a scanning spot control signal, said reference value representing the maximum contrast acceptance limits of said photographic receiving media;
    d. memory scanning the original while simultaneously (1) modulating the scanning spot with said control signal, and (2) recording the light level passing through the original in a memory storage means, said controlled modulation being effective to alter the contrast excursion limits and determine the exposure level required, said modulated light level representing a modified luminous mask of the original to be duplicated;
    e. positioning said opaque photographic receiving media over said color original and in intimate contact therewith;
    f. exposing said opaque photographic receiving media with said scanning spot while modulating said spot with the luminous mask signal stored in said memory storage means, whereby the exposure level and contrast excursion limits of said exposure are retained within the predetermined contrast excursion limits of the opaque photographic receiving media.

26. A method of automatically modifying the exposure level and contrast excursion limits of a color contact printer as claimed in claim 25, wherein said exposing step further includes:
    a. replicating the signal from said memory storage signal into first and second output currents;
    b. modulating the intensity of said scanning spot in response to said first output current;
    c. modulating the velocity of said scanning spot in response to said second output current.

27. A method of automatically modifying the exposure level and contrast excursion limits for a color contact printer as claimed in claim 26, wherein said positioning step further includes:
    a. mounting said opaque photographic received media in a moveable carriage for transport from a storage position to an exposure position, said carriage having a pair of rollers for tensioning said media over said color original;
    b. urging said color original into intimate contact with said opaque media with a moveable transparent platen which reciprocates from a first position below said parallel rollers to a second exposing position above a tangential plane defined by said rollers.

28. A method of automatically modifying the exposure level and contrast excursion limits for a color contact printer as claimed in claim 25, wherein said recording step includes the positioning of a plurality of charges on a plurality of microcapacitors in an image storage tube.

29. A method of automatically modifying the exposure level and contrast excursion limits for a color contact printer as claimed in claim 25, wherein said recording step includes converting the light passing through the original into a digital electrical signal, and storing said signal in a digital memory means.

30. A method of automatically modifying the exposure level and contrast excursion limits for a color contact printer as claimed in claim 26, which further includes generating said scanning spot by positioning red, blue and green CRTs below the original and imaging the light generated by the CRTs onto the color original in a single unsharply-focussed spot.

* * * * *